United States Patent [19]

Monte

[11] Patent Number: 5,141,758
[45] Date of Patent: Aug. 25, 1992

[54] METHOD FOR EXTENDING LIFE OF VITAMIN C IN DRINK

[76] Inventor: Woodrow C. Monte, 6411 S. River Dr., #65, Tempe, Ariz. 85283

[21] Appl. No.: 791,183

[22] Filed: Nov. 13, 1991

[51] Int. Cl.$^5$ .......................... A23L 2/02; A23L 1/302
[52] U.S. Cl. ...................................... 426/72; 426/590; 426/599
[58] Field of Search ................. 426/72, 541, 801, 590, 426/599

[56] References Cited

U.S. PATENT DOCUMENTS

| | | | |
|---|---|---|---|
| 2,383,816 | 8/1945 | Riemenschneider | 426/541 |
| 3,958,017 | 5/1976 | Morse | 426/72 |
| 4,208,434 | 6/1980 | Iacobucci | 426/72 |
| 4,497,835 | 2/1987 | Winston | 426/72 |
| 4,753,926 | 6/1988 | Lucas | 426/72 |

FOREIGN PATENT DOCUMENTS

| | | | |
|---|---|---|---|
| 3603000 | 8/1987 | Fed. Rep. of Germany | 426/801 |
| 2166637 | 5/1986 | United Kingdom | 426/72 |

OTHER PUBLICATIONS

Chemicals used in Food Processing 1965 National Academy of Sciences-National Research Council pp. 9 & 57.

*Primary Examiner*—Carolyn Paden
*Attorney, Agent, or Firm*—Tod R. Nissle

[57] ABSTRACT

A method for extending the shelf life of vitamin C in a drink once the drink is exposed to the ambient air. The method comprises adding ascorbyl palmitate to the drink.

2 Claims, No Drawings

METHOD FOR EXTENDING LIFE OF VITAMIN C IN DRINK

This invention relates to ingestible liquid drinks which provide a source of vitamin C.

More particularly, the invention relates to a method for extending the shelf life of vitamin C in a drink once the drink is exposed to the ambient air.

Once a drink is exposed to the ambient air, the vitamin C in the drink rapidly oxidizes and degenerates. Consequently, attempting to store drinks which contain Vitamin C in relatively porous containers like milk cartons insures that the Vitamin C in the drink will rapidly deteriorate and be eliminated from the drink. Storing a drink in a sealed container minimizes this problem and extends the life of vitamin C in the drink, but once the sealed container is opened and exposed to the ambient air, the oxidation of vitamin C in the drink begins in earnest. To date, there apparently has been no method for extending the life of vitamin C in a drink exposed to the ambient air.

Another problem encountered in preserving vitamin C in a drink is that vitamin C is sensitive to and tends to more rapidly deteriorate in the presence of heat.

Accordingly, it would be highly desirable to provide a simple, relatively inexpensive method of increasing the shelf life of vitamin C in drinks exposed to the air and to heat.

Therefore, it is the principal object of the invention to provide a method for decreasing the oxidation of vitamin C in the presence of air and for increasing the heat resistance of the vitamin C.

This and other, further and more specific objects and advantages of the invention will be apparent to those skilled in the art from the following detailed description thereof.

Briefly, I have discovered a method for increasing the life of vitamin C in drinks exposed to the air by mixing effective amounts of ascorbyl palmitate into the drinks. While large amounts of ascorbyl palmitate equal to 100%, 200% or more by weight of the weight of vitamin C in the drink can be added to the drink, it is presently preferred that a weight of ascorbyl palmitate equal to about 1% to 25% of the weight of vitamin C in the drink be mixed into the drink. Adding larger amounts of ascorbyl palmitate in excess of about 25% of the weight of vitamin C is not presently believed to decrease significantly the effectiveness of the method of the invention or to increase significantly the effectiveness of the method of the invention; however, adding a quantity of ascorbyl palmitate equal to about 1% to 25% of the weight of vitamin C in a drink significantly increases the life of vitamin C in the drink if the drink is exposed to the air. Consequently, if an eight ounce glass of a liquid drink contains the minimum RDA of 60 milligrams of vitamin C, then from 0.6 to 15.0 milligrams of ascorbyl palmitate is preferably included in the drink to slow the deterioration of the vitamin C when the drink is exposed to the ambient air or to heat. Larger quantities of ascorbyl palmitate equal to 50%, 100%, 200%, 500%, 1000% or more of the quantity of vitamin C in the drink also act to increase the life of vitamin C in the drink. As would be appreciated by those skilled in the art, the amount of vitamin C in the drink can vary from small amounts of 0.001% by weight or less up to 4.00% by weight or more. The ascorbyl palmitate utilized in the invention prolongs the life of even small amounts of vitamin C in a drink. Since some physicians advocate the ingestion of large amounts of vitamin C, eight ounces of a drink can contain 100 milligrams, 1000 milligrams, 10,000 milligrams or more of vitamin C. In most cases however, eight ounces of a drink typically will contain sixty milligrams or less of vitamin C.

The ascorbyl palmitate used in the invention is readily mixed together with other components of the drink when the drink is produced. To facilitate the addition of ascorbyl palmitate into a drink, the ascorbyl palmitate can be mixed with an aqueous ethanol solution of 10% by weight ethanol. Typically, one gram of ascorbyl palmitate is admixed with about one gram of ethanol solution. It is preferred, but not required, that a small amount of fat be present in the drink. The ascorbyl palmitate seeks out the fat. The fat acts as a host for the ascorbyl palmitate and is believed to extend the life of the ascorbyl palmitate in the drink. The amount of fat in the drink is preferably greater than or equal to about 0.0001% by weight, and is in the range of 0.0001% to about 40.0% by weight.

The method of the invention can be utilized in most, if not all, drinks normally ingested by human beings, including milk, cream, buttermilk, and other dairy product drinks; fruit drinks or juices; food composition drinks which include which include protein aminoacids, triglycerides, carbohydrates, emulsifiers, etc.; electrolyte drinks like GATORADE ®; flavored sugar drinks like KOOL-AID ®; alcoholic beverages; heated beverages; and, other drinks which include water as a primary component.

The vitamin C present in a drink produced in accordance with the method of the invention can be naturally occurring, or can be provided in the form of ascorbic acid, sodium ascorbate, calcium ascorbate, or any other desired conventional source of vitamin C.

Drinks treated with ascorbyl palmitate in accordance with the method of the invention can be refrigerated, stored at room temperature, or heated. A particular advantage of the method of the invention is that it helps minimize the destruction of vitamin C which occurs when a drink is heated.

The following examples depict the presently preferred embodiments of the invention for the purpose of illustrating the practice thereof and not b way of limitation of the scope of the invention. In the examples, all proportions are by weight, unless otherwise noted.

EXAMPLE 1

One cup of refrigerated, pasteurized, homogenized, grade A whole milk is obtained. The cup of milk provides 150 calories and has 8 grams of protein, 11 grams of carbohydrates, 8 grams of fat, 125 milligrams of sodium, and 340 milligrams of potassium. The cup of milk provides the following percentages of the U. S. recommended daily allowances (U. S. RDA):

| Vitamin/Mineral | Percentage |
| --- | --- |
| Protein | 20 |
| Vitamin A | 4 |
| Vitamin C | 4 |
| Thiamine | 6 |
| Riboflavin | 25 |
| Niacin | less than 2 |
| Calcium | 25 |
| Iron | less than 2 |
| Vitamin D | 25 |
| Vitamin B6 | 4 |
| Vitamin B12 | 15 |

| Vitamin/Mineral | Percentage |
| --- | --- |
| Phosphorous | 20 |
| Magnesium | 8 |
| Zinc | 4 |
| Pantothenic Acid | 6 |

The RDA of vitamin C is 60 milligrams. Accordingly, the cup of milk contains 2.40 milligrams of vitamin C.

The cup of milk is placed in an open glass in a refrigerator and after seven days is tested to determine the quantity of vitamin C in the milk. After seven days no vitamin C remains in the milk.

EXAMPLE 2

One cup of refrigerated milk having the composition of the milk of EXAMPLE 1 is obtained. 0.24 milligrams of ascorbyl palmitate is added to the cup of milk. The cup of milk is placed in an open glass in a refrigerator and is tested monthly to determine the quantity of vitamin C in the milk. After one month, the quantity of vitamin C in the milk is about 2.07 milligrams per eight ounces of milk. After two months, the quantity of vitamin C in the milk is about 1.66 milligrams per eight ounces of milk. After three months, the quantity of vitamin C in the milk is about 1.15 milligrams per eight ounces of milk.

EXAMPLE 3

Two cups of MOTT'S apple juice is obtained. The apple juice was prepared from apple concentrate, is "100% natural", has a temperature equal to room temperature (76 degrees Fahrenheit), and contains no additives or preservative. The apple juice is tested for vitamin C. There is no vitamin C present in the apple juice. Sixty milligrams of ascorbic acid is mixed into one cup of the apple juice and the apple juice is placed in an open glass which is stored in a refrigerator and after a week is tested to determine the amount of vitamin C remaining in the apple juice. After one week, there is no vitamin C remaining in the apple juice.

EXAMPLE 4

One cup of MOTT's apple juice having the composition and ambient room temperature of the apple juice of EXAMPLE 3 is obtained. The apple juice has no vitamin C. Sixty milligrams of ascorbic acid and 12 milligrams of ascorbyl palmitate are mixed into the apple juice and the apple juice is placed in an open glass which is stored in a refrigerator and tested monthly to determine the amount of vitamin C remaining in the apple juice. After one month, the amount of vitamin C remaining in the apple juice is about fifty four milligrams per eight ounces of apple juice. After two months, the amount of vitamin C remaining in the apple juice is about forty three milligrams per eight ounces of apple juice. After three months, the amount of vitamin C remaining in the apple juice is about 31 milligrams per eight ounces of apple juice.

EXAMPLE 5

A food composition was prepared by blending the following ingredients.

| Ingredient | Weight in Grams |
| --- | --- |
| MALTODEXTRAN (POLYSACCHARIDE) | 27.85536 |
| MALTODEXTRAN AGGLOMERATED | 24.98139 |
| MCT OIL | 6.76487 |
| CORN OIL | 6.76487 |
| WHEY PROTEIN POWDER | 9.28512 |
| HYDROLYZED PROTEIN POWDER (dipeptides, tripeptides, oligopeptides) | 8.84297 |
| SODIUM ACETATE | 0.88430 |
| POTASSIUM CITRATE | 0.57479 |
| CALCIUM PHOSPHATE TRIBASIC | 0.70744 |
| DIPOTASSIUM PHOSPHATE | 0.79587 |
| MAGNESIUM CHLORIDE 6H | 0.88430 |
| CITRIC ACID | 1.94545 |
| FERROUS SULFATE | 0.01365 |
| ZINC SULFATE 1H | 0.01852 |
| MANGANESE SULFATE 1H | 0.00458 |
| CUPRIC SULFATE 5H | 0.00224 |
| CHROMIC CHLORIDE | 0.00012 |
| POTASSIUM IODIDE | 0.00005 |
| SELENIUM OXIDE | 0.00003 |
| MOLYBEDNUM TRIOXIDE | 0.00003 |
| LECITHIN | 0.44215 |
| CHLORINE CHLORIDE | 0.20470 |
| VITAMIN E (500 IU/GM) | 0.04971 |
| NIACINAIDE | 0.01803 |
| CALCIUM PANTOTHENATE | 0.01560 |
| THIAMINE HYDROCHLORIDE | 0.00244 |
| PRIDOXINE HYDROCHLORIDE | 0.00302 |
| RIBOFLAVIN | 0.00175 |
| VITAMIN A (250.000 IU/GM) | 0.01072 |
| FOLIC ACID | 0.00044 |
| BIOTIN (1% 10 MG/GM) | 0.02534 |
| VITAMIN K 1% | 0.00429 |
| VITAMIN D3 (1,000.000 IU/GM) | 0.00292 |
| CYANOCOBALAMIN (0.1%) | 0.00575 |
| ASCORBIC ACID | 0.06000 |
| ASCORBYL PALMITATE | 0.00300 |
| SOY POLYSACCHARIDE (FIBER) | 8.82418 |
| TOTAL WEIGHT | 100.00000 |

The approximate percent Calories from the various ingredients are carbohydrates 52.4%, fat 30.5%, and protein 17.1%. The carbohydrates included in the powder food composition include sucrose, dextrose, maltose, lactose, trisaccharides, tetrasaccharides, pentasaccharides, hexasaccharides, and higher saccharides. The food powder composition has a caloric density (Cal/ml) of 1.07; a total Cal/Nitrogen ratio of 145.9; a non-protein Cal/Nitrogen ratio of 120.9; a protein concentration of 45.8 g/liter; a fat concentration of 36.1 g/liter; a carbohydrate (digestible) concentration of 140.0 g/liter; a carbohydrate (total) concentration of 153.8 g/liter; and, a dietary fiber concentration of 14.0 g/liter.

During the blending of the above-listed ingredients of the food composition, agglomeration techniques are preferably employed to make the resulting powder mixture more easily dispersed and soluble in water.

EXAMPLE 6

The one hundred grams of powder prepared in EXAMPLE 5 was mixed with 300 grams of water at room temperature. The resulting drink was placed in an open glass which was stored in a refrigerator. The concentration of vitamin C in the drink was tested monthly. After one month the concentration of vitamin C was about 48 milligrams per four hundred grams of drink. After two months the concentration of vitamin C was about 36 milligrams per four hundred grams of drink. After three months, the concentration of vitamin C was about 27 milligrams per four hundred grams of drink.

EXAMPLE 7

The powder of EXAMPLE 5 is prepared except that the ascorbyl palmitate is omitted. The resulting 99.997 grams of powder is mixed with 300 grams of water at room temperature to form a drink. The drink is poured into an open glass. The glass is stored in a refrigerator and the concentration of vitamin C in the drink is tested after a seven days. After seven days there was no vitamin C in the drink

EXAMPLE 8

The contents of a 0.14 ounce package of lemon-lime KOOL-AID soft drink mix and one cup of sugar are mixed into two quarts of water in an open glass pitcher at room temperature to form an aqueous KOOL-AID mixture. Eight ounces of the aqueous KOOL-AID mixture provides two calories, 0 grams of protein, 25 grams of carbohydrates, 0 grams of fat, and 0 grams of sodium. Eight ounces of the KOOL-AID mixture contains the follow percentages of the U.S. recommended daily allowances:

| Ingredient | Percentage of U.S. RDA |
| --- | --- |
| Vitamin C | 10.0 |
| Protein | Less than 2% |
| Vitamin A | Less than 2% |
| Thiamine | Less than 2% |
| Riboflavin | Less than 2% |
| Niacin | Less than 2% |
| Calcium | Less than 2% |
| Iron | Less than 2% |

The contents of the 0.14 ounce package include citric acid, tricalcium phosphate, sugar, vitamin C, lemon juice dried with corn syrup solids, artificial color including Yellow 5, natural lemon-lime flavor with other natural flavors and BHA preservative.

The open pitcher of KOOL-AID mixture is stored in a refrigerator and the concentration of vitamin C is tested after seven days. After seven days, there is no vitamin C remaining in the KOOL-AID mixture.

EXAMPLE 9

The aqueous KOOL-AID mixture of EXAMPLE 8 is prepared except that 4.8 milligrams of ascorbyl palmitate is also mixed into the two quarts of water along with sugar and the contents of the 0.14 ounce KOOL-AID package. The open glass pitcher is stored in a refrigerator and the concentration of vitamin C is tested monthly. After one month about 38 milligrams of Vitamin C remains per two quarts of KOOL-AID mixture. After two months about 29 milligrams of vitamin C remains per two quarts of KOOL-AID mixture. After three months about 18 milligrams of vitamin C remains per two quarts of KOOL-AID mixture.

EXAMPLE 10

EXAMPLES 5 and 6 are repeated, except that 0.6 milligrams of ascorbyl palmitate is utilized instead of 3.0 milligrams of ascorbyl palmitate when the one hundred grams of food composition powder is prepared in EXAMPLE 5. Similar results are obtained. The ascorbyl palmitate functions to extend the life of the vitamin C in the food composition drink.

EXAMPLE 11

EXAMPLES 5 and 6 are repeated, except that 15.0 milligrams of ascorbyl palmitate is utilized instead of 3.0 milligrams of ascorbyl palmitate when the one hundred grams of food composition powder is prepared in EXAMPLE 5. Similar results are obtained. The ascorbyl palmitate functions to extend the life of the vitamin C in the food composition drink.

EXAMPLE 12

EXAMPLES 5 and 6 are repeated, except that 10.0 milligrams of ascorbyl palmitate is utilized instead of 3.0 milligrams of ascorbyl palmitate when the one hundred grams of food composition powder is prepared in EXAMPLE 5. Similar results are obtained. The ascorbyl palmitate functions to extend the life of the vitamin C in the food composition drink.

EXAMPLE 13

EXAMPLE 2 is repeated, except that 4.8 milligrams of ascorbyl palmitate is added to the eight ounce cup of milk along with the 2.40 milligrams of vitamin C. Similar results are obtained.

EXAMPLE 14

EXAMPLE 3 is repeated except sixty milligrams of sodium ascorbate is utilized in the apple juice instead of the sixty milligrams of ascorbic acid. Similar results are obtained.

EXAMPLE 15

EXAMPLE 4 is repeated, except sixty milligrams of sodium ascorbate is utilized in the apple juice instead of the sixty milligrams of ascorbic acid Similar results are obtained.

EXAMPLE 16

EXAMPLE 15 is repeated, except 240 milligrams of ascorbyl palmitate is utilized in the apple juice along with the sixty milligrams of sodium ascorbate. Similar results are obtained. A significant amount of vitamin C remain in the apple juice after three months.

EXAMPLE 17

EXAMPLE 15 is repeated, except 120 milligrams of ascorbyl palmitate is utilized in the apple juice along with the sixty milligrams of sodium ascorbate. Similar results are obtained.

EXAMPLE 18

EXAMPLES 5 and 6 are repeated, except that 60 milligrams of calcium ascorbate is utilized instead of 60 milligrams of ascorbic acid when the one hundred grams of food composition powder is prepared in EXAMPLE 5. Similar results are obtained.

EXAMPLE 19

EXAMPLE 15 is repeated, except 600 milligrams of ascorbyl palmitate is utilized in the apple juice along with the sixty milligrams of sodium ascorbate. Similar results are obtained.

EXAMPLE 20

EXAMPLE 18 is repeated, except that in the food composition powder of EXAMPLE 5, sixty milligrams of ascorbyl palmitate is utilized instead of only three milligrams of ascorbyl palmitate. Consequently, the amount of ascorbyl palmitate is 100% the amount of calcium ascorbate. Similar results are obtained.

EXAMPLE 21

EXAMPLE 18 is repeated, except that in the food composition powder of EXAMPLE 5, 240 milligrams of ascorbyl palmitate is utilized instead of only three milligrams of ascorbyl palmitate. Consequently, the amount of ascorbyl palmitate is 400% the amount of calcium ascorbate. Similar results are obtained.

EXAMPLE 22

EXAMPLE 18 is repeated, except that in the food composition powder of EXAMPLE 5, 600 milligrams of ascorbyl palmitate is utilized instead of only three milligrams of ascorbyl palmitate. Consequently, the amount of ascorbyl palmitate is 1000% the amount of calcium ascorbate. Similar results are obtained.

EXAMPLE 23

EXAMPLES 10, 11, 12 are each repeated, except that sixty milligrams of sodium ascorbate is utilized in the powder of EXAMPLE 5 in place of the sixty milligrams of ascorbic acid. Similar results are obtained.

EXAMPLE 24

EXAMPLES 18, 20, 21, 22 are each repeated, except that sixty milligrams of sodium ascorbate is utilized in the powder of EXAMPLE 5 in place of the sixty milligrams of ascorbic acid. Similar results are obtained.

EXAMPLE 25

A bottle of Ernest & Julio Gallo's 1989 White Zinfandel wine is obtained. The wine is about 12% alcohol by volume and is bottled by Ernest & Julio Gallo of Modesto, California. Eight ounces of the wine is poured into an open glass and sixty milligrams of sodium ascorbate is added to the glass of wine. The open glass is stored in a refrigerator and after seven days is tested to determine the quantity of vitamin C in the wine. After seven days no vitamin C remains in the wine.

EXAMPLE 26

EXAMPLE 25 is repeated except that six milligrams of ascorbyl palmitate is added to the glass of wine before the wine is placed in the refrigerator. After seven days, about 56 milligrams of vitamin C remain in the wine.

EXAMPLE 27

EXAMPLE 26 is repeated except that two milligrams of sodium ascorbate and 8.2 milligrams of ascorbyl palmitate are added to the eight ounce glass of wine instead of sixty milligrams of sodium ascorbate and six milligrams of ascorbyl palmitate. After seven days, about one and threequarters milligrams of vitamin C remain in the glass of wine.

EXAMPLE 28

One cup of milk having the composition of the milk of EXAMPLE 1 is obtained. The milk is heated to 200 degrees Fahrenheit and allow to stand for an hour in ambient air. After one hour, the vitamin C content in the milk is tested. The amount of vitamin C is about 2.00 milligrams.

EXAMPLE 29

EXAMPLE 28 is repeated, except that 0.24 milligrams of ascorbyl palmitate is added to the cup of milk before the milk is heated to 200 degrees Fahrenheit. After the milk has stood for an hour in ambient air, the vitamin C content is the milk is about 2.30 milligrams.

EXAMPLE 30

Eight ounces of orange juice is squeezed from oranges and placed in an open glass. The glass is stored in a refrigerator and after seven days the orange juice is tested to determine the amount of vitamin C present. After seven days, there is no vitamin C present in the orange juice.

EXAMPLE 31

Eight ounces of orange juice is squeezed from oranges and placed in an open glass. The orange juice is tested to determine the amount of natural vitamin C present in the orange juice. Six milligrams of ascorbyl palmitate is mixed into the orange juice. The glass is stored in a refrigerator and after seven days the orange juice is tested to determine if vitamin C is present. After seven days, over fifty percent of the naturally occurring vitamin C originally present in the orange juice remains.

EXAMPLE 32

EXAMPLE 4 is repeated except 10 milligrams of ascorbic acid and 1 milligram of ascorbyl palmitate are mixed into the apple juice instead of 60 milligrams of ascorbic acid and 12 milligrams of ascorbyl palmitate. After one month, about 8 milligrams of vitamin C remain in the apple juice; after two months; about 6 milligrams; and after three months, about 4 milligrams of vitamin C remain in the apple juice.

In the foregoing examples, when ascorbyl palmitate is mixed into liquid drinks, the ascorbyl palmitate was in combination with a aqueous ethanol solution containing 10% by weight ascorbyl palmitate. Any other desired prior art methods can be utilized to add ascorbyl palmitate into a drink. If the drink contains small amounts of ethanol or another chemical components which dissolves ascorbyl palmitate, then the ascorbyl palmitate can, if desired, be added directly to the drink without first dissolving the ascorbyl palmitate in an aqueous ethanol solution. Or, ascorbyl palmitate in powder form can be blended with vitamins in powder form to produce a powder composition which is mixed into drinks.

Tests for determining the amount of vitamin C in a liquid composition are well known in the art and will not be described in detail herein. For example, a test for determining the amount of ascorbic acid in orange, grapefruit, lemon, lime and tomato juice is described at Section 39.039 of *Official Methods of Analysis of the Association of Official Agricultural Chemists* (Ninth Edition, 1960, Association of Official Agricultural Chemists, P. O. Box 540, Benjamin Franklin Station, Washington 4, D. C.).

Having described the invention in such terms as to enable those skilled in the art to understand and practice it, and having identified the presently preferred embodiments thereof, I claim:

1. A liquid fruit juice product for ingestion by a human being, comprising
   (a) from 45.0% to 85.0% by weight water;
   (b) from 10.0% to 34.0% by weight fruit juice concentrate;
   (c) from 3.0% to 15.0% by weight sweetener;
   (d) from 0.001% to 1.00% fat;
   (e) vitamin C; and,
   (f) ascorbyl palmitate.

2. A liquid food composition for ingestion by a human being, comprising
(a) from 40.0% to 98.0% by weight water;
(b) from 1.0% to 50% by weight powder, said powder including
  (i) from 4% to 22% by weight of triglycerides of predominantly 6 to 26 carbon atoms in the fatty acid chains,
  (ii) from 6% to 28% by weight of water soluble protein alpha-amino acids,
  (iii) from 56% to 75% by weight of carbohydrates selected from the group consisting of corn syrup solids, trisaccharides, tetrasaccharides, pentasaccharides, hexasaccharides, dextrose, fructose, maltose, ligosaccharides and high saccharides,
  (iv) from 0.1% to 6.0% by weight of an emulsifier, and
  (v) from 0.1% to 6.0% by weight of an edible acid for adjusting the pH of the food composition within the range of 2.0 to 6.5;

* * * * *